United States Patent [19]

Washizawa et al.

[11] Patent Number: 5,502,710

[45] Date of Patent: Mar. 26, 1996

[54] RECORDING BIT EXTRACTION BY CALCULATING CURVATURE OF PIXELS IN SCANNING PROBE MICROSCOPE

[75] Inventors: Teruyoshi Washizawa, Atsugi; Katsunori Hatanaka, Yokohama; Kunihiro Sakai, Isehara; Takahiro Oguchi, Yamato; Akihiko Yamano; Shunichi Shido, both of Sagamihara, all of Japan

[73] Assignee: Canon Kabushiki Kaisha, Tokyo, Japan

[21] Appl. No.: 207,064

[22] Filed: Mar. 8, 1994

[30] Foreign Application Priority Data

| Mar. 8, 1993 | [JP] | Japan | 5-046978 |
| Apr. 5, 1993 | [JP] | Japan | 5-078186 |
| Jun. 29, 1993 | [JP] | Japan | 5-159487 |

[51] Int. Cl.$^6$ ........................... G11B 9/00
[52] U.S. Cl. .................. 369/124; 369/126; 369/101; 250/306; 250/307
[58] Field of Search .................. 369/126, 101; 250/306, 307; 365/151; 356/71; 382/260

[56] References Cited

U.S. PATENT DOCUMENTS

| 5,323,003 | 7/1994 | Shido et al. | 250/307 |
| 5,329,513 | 7/1994 | Nose | 369/126 |
| 5,343,460 | 8/1994 | Miyazaki et al. | 369/126 |

FOREIGN PATENT DOCUMENTS

| 1142988 | 6/1989 | Japan | G06F 15/68 |
| WO86/01920 | 3/1986 | WIPO | G06F 15/70M |

OTHER PUBLICATIONS

Proceed. CVPR'86: IEEE Computer Society Conference On Computer Vision and Pattern Recognition, 22 Jun. 1986, Miami Beach, FL, USA, pp. 338–343, Saint–Marc P. Richetin M., "Structural Filtering From Curvature Information".

ICASSP'91: 1991 International Conference On Accoustics, Speech and Signal Processing, vol. 4, 14 May 1991, Toronto, Ontario, Canada, pp. 2993–2996, Greiner et al., "Speckle Reduction In Ultrasonic Imaging For Medical Applications".

Journal of Applied Physics, vol. 71, No. 4, 15 Feb. 1992, USA, pp. 1565–1578, Weisman A. D. et al. "Nonlinear Digital Filtering of Scanning–Probe–Microscopy Images by Morphological Psuedoconvolutions".

*Primary Examiner*—Georgia Y. Epps
*Assistant Examiner*—Kim-Kwok Chu
*Attorney, Agent, or Firm*—Fitzpatrick, Cella, Harper & Scinto

[57] ABSTRACT

An image information processing apparatus for processing image information includes a total curvature calculating unit, mean curvature calculating unit, a logical product computing unit and a median filter. A total curvature at each pixel of the image information is calculated by the total curvature calculating unit. A mean curvature at each pixel of the image information is calculated by the mean curvature calculating unit. The logical product computing unit executes computation of a logical product of outputs from the total curvature calculating unit and the mean curvature calculating unit. An output from the logical product computing unit is filtered by the median filter.

8 Claims, 11 Drawing Sheets

RECORDING BIT EXTRACTION BY CALCULATING CURVATURE OF PIXELS IN SCANNING PROBE MICROSCOPE

BACKGROUND OF THE INVENTION

1. Field of the Invention

The present invention relates to an image processing apparatus and a recording/reproducing apparatus and, more particularly, a recording/reproducing apparatus for recording information on a recording medium and reproducing the recorded information as image information using a signal obtained by a physical interaction between the recording medium and a probe electrode upon two-dimensional scanning of the probe electrode relative to the recording medium, and an image processing apparatus suitable for this recording/reproducing apparatus.

2. Related Background Art

In recent years, the recording capacity of data required for a recording/reproducing apparatus tends to increase. To meet this increase, the size of the unit of recording is reduced, and the density of the unit of recording must be increased. For example, in a digital audio disk using optical recording, the size of the unit of recording is reduced to about 1 µm².

On the other hand, a scanning tunnel microscope (STM) capable of allowing direct observation of the electron structure on or near the surface of a material has been developed and has the following advantages, so that a variety of applications are expected.

(1) A real spatial image can be measured at a high resolution regardless of the monocrystalline and amorphous materials.

(2) A low-power observation can be performed without damaging a recording medium by a current.

(3) The microscope can be operated in an ultra high vacuum, air, and a solution.

(4) The microscope can be used for a variety of materials.

The scanning tunnel microscope utilizes the flow of a tunnel current (i.e., a signal obtained by a physical interaction between a probe electrode (metal probe) and a conductive material) between the probe electrode and the conductive material while a voltage is being applied between the probe electrode and the conductive material. The tunnel current is very sensitive to a change in distance between the probe electrode and the conductive material. When the probe electrode is two-dimensionally scanned relative to the surface of the conductive material so as to keep the average distance between the probe electrode and the conductive material or the tunnel current constant, thereby obtaining surface information of the real space of the conductive material. At this time, the resolution in the longitudinal direction of the conductive material is 10 nm or less.

When the principle of this scanning tunnel microscope is applied, a material (a thin film layer of π electron organic compound or chalcogen compound) having a memory effect for voltage and current switching characteristics is used as a recording medium to allow recording/reproduction of information in recording units of 0.01 µm² or less. In addition, a technique for changing the surface shape/state of a recording medium using an electromagnetic wave such as an electron beam or light is used to allow information recording/reproduction at a recording density almost equal to that of the state-of-the-art optical recording although the unit of recording increases due to the limitations of the degree of focusing of an electron beam or the like.

In a conventional recording/reproducing apparatus to which the principle of the scanning tunnel microscope is applied, when high-density recording/reproduction is to be performed on the entire surface (recording surface) of a recording medium having a predetermined area, the S/N ratio of the reproduced signal decreases and the error rate increases due to the three-dimensional pattern formed on the recording surface. The three-dimensional pattern avoids an increase in recording capacity.

To reduce this physical three-dimensional pattern on the surface of the recording medium, a method of growing a monocrystalline Au thin film on the cleavage surface of mica or the like to obtain a smooth surface can be used. Even if a recording medium obtained by this method is used, however, the shape of a recording bit is changed by a step or ridge on the atomic order through a three-dimensional pattern having a size almost equal to that of a recording bit on the order of 10 nm or less in diameter. As a result, the S/N ratio of the reproduced signal decreases, and the error ratio increases.

Filtering in a frequency range belonging to a linear filter may be used as a method of reducing noise of the reproduced signal. However, this method is effective only if the frequency bands of a signal and noise in the reproduction mode are known and can be linearly separated. Although the frequency bands for individual shapes are known, the positions of recording bits are unknown. In addition, the step or ridge has a portion (i.e., an edge) having a large differential coefficient on the spatial coordinate system. For this reason, these frequency components extend through the entire frequency range. At the same time, the compact recording bit frequency components spatially extend to the entire range. Therefore, these frequency components cannot be separated into bands on the frequency space. In addition, the position of the step or ridge cannot be specified, and it is therefore difficult to perform extraction using template matching of a power spectrum.

On the other hand, a technique belonging to the field of nonlinear filters is available as a conventional image processing technique having spatial correlation as its most important factor. According to this technique, an extraction image obtained by extracting the step or ridge from an image is prepared, and the extraction image is subtracted from the original image to remove the step or ridge. Since the technique for extracting only the step or ridge from the image, however, has a repetitive and serial processing form and strongly depends on the number of pixels, this technique is very disadvantageous in a recording/reproducing apparatus whose read rate is most important.

SUMMARY OF THE INVENTION

It is an object of the present invention to provide a recording/reproducing apparatus capable of reducing an error rate caused by a step or ridge on the atomic order in the reproduction mode.

It is another object of the present invention to provide an image processing apparatus having parallel processing characteristics free from the number of pixels.

In order to achieve the above objects of the present invention, there is provided an image information processing apparatus for processing image information, comprising total curvature calculating means for calculating a total curvature at each pixel of the image information, mean curvature calculating means for calculating a mean curvature at each pixel of the image information, logical product computing means for computing a logical product of outputs from the total curvature calculating means and the mean curvature calculating means, and a median filter for filtering an output from the logical product computing means.

According to the present invention, there is also provided an image information processing apparatus for processing image information, comprising means for calculating a numerator of a total curvature at each pixel of the image information, means for calculating a numerator of a mean curvature at each pixel of the image information, logical product computing means for computing a logical product of outputs from the means for calculating the numerator of the total curvature and the means for calculating the numerator of the mean curvature, and a median filter for filtering an output from the logical product computing means.

According to the present invention, there is further provided an information recording/reproducing apparatus for reproducing information from a recording medium by utilizing a physical interaction between a probe and the recording medium while the probe is two-dimensionally scanned relative to the recording medium, comprising total curvature calculating means for calculating a total curvature at each pixel of surface information of the recording medium, the surface information being detected by the physical interaction, mean curvature calculating means for calculating a mean curvature at each pixel of the surface information, logical product computing means for computing a logical product of outputs from the total curvature calculating means and the mean curvature calculating means, and a median filter for filtering an output from the logical product computing means, wherein an output from the medium filter is reproduced information.

According to the present invention, there is still further provided an information recording/reproducing apparatus for reproducing information from a recording medium by utilizing a physical interaction between a probe and the recording medium while the probe is two-dimensionally scanned relative to the recording medium, comprising means for calculating a numerator of a total curvature at each pixel of surface information of the recording medium, the surface information being detected by the physical interaction, means for calculating a numerator of a mean curvature at each pixel of the surface information, logical product computing means for computing a logical product of outputs from the means for calculating the numerator of the total curvature and the means for calculating the numerator of the mean curvature, and a median filter for filtering an output from the logical product computing means, wherein an output from the median filter is reproduced information.

The above and other objects, features, and advantages of the present invention will be described in detail with reference to the detailed description of preferred embodiments taken in conjunction with the accompanying drawings.

BRIEF DESCRIPTION OF THE DRAWINGS

FIGS. 2A, 2B, and 2C are views showing the shapes of a ridge, a step, and a recording bit on the atomic order, all of which are present on the recording surface of a recording medium, in which FIG. 2A is a view showing the shape of the ridge, FIG. 2B is a view showing the shape of the step, and FIG. 2c is a view showing the shape of the recording bit;

FIGS. 10A, 10B, and 10C are views showing differences in filter characteristics between an entropy filter and a median filter, in which FIG. 10A is a view showing an input signal, FIG. 10B is a view showing a processing result of the median filter, and FIG. 10C is a view showing the processing result of the entropy filter;

DETAILED DESCRIPTION OF THE PREFERRED EMBODIMENTS

First Embodiment

In an image processing apparatus of the first embodiment of the present invention, two-dimensional image information is regarded as a function defined on a two-dimensional plane, and a total curvature of the function at each point (each pixel of image information) on the two-dimensional plane is obtained. A point at which the sign of the total curvature is positive is detected as an elliptic point, and a point at which the sign of the total curvature is not positive is detected as a parabolic or hyperbolic point. The mean curvature of functions at points on the two-dimensional plane is obtained. An elliptic point at which the mean curvature is negative has a convex shape on the recording surface, and an elliptic point at which the mean curvature is positive has a concave shape on the recording surface. If it is known that an elliptic point on the convex curve on the recording surface exhibits necessary information, a logical product of an output signal from the total curvature calculating means and an output signal from the mean curvature calculating means is computed to remove error information included in the image information, thereby extracting only necessary information. An output signal from the logical product computing means is input to a median filter to remove noise caused by discretization of spatial coordinates.

The recording/reproducing apparatus of the first embodiment of the present invention includes image information forming means for calculating the total and mean curvatures at each pixel of the image information reproduced from a signal obtained by the physical interaction to form new image information. The recording bit becomes an upwardly curved convex surface (to be referred to as an ON bit hereinafter), i.e., a set of upward convex elliptic points or a downwardly curved concave surface (to be referred to as an OFF bit hereinafter), i.e., a set of downwardly concave elliptic points. For this reason, the parabolic points, the hyperbolic points, the upwardly concave elliptic points (or upwardly concave elliptic points) on the recording surface are removed to extract only the recording bit, thereby obtaining new image information.

Each of the total and mean curvatures at each pixel can be obtained by calculating the first and second fundamental quantities at each pixel. Since the first and second fundamental quantities are locally defined, the processing form has parallel processing characteristics independent of the number of pixels.

The first embodiment of the present invention will be described with reference to the accompanying drawings.

Figure 1:
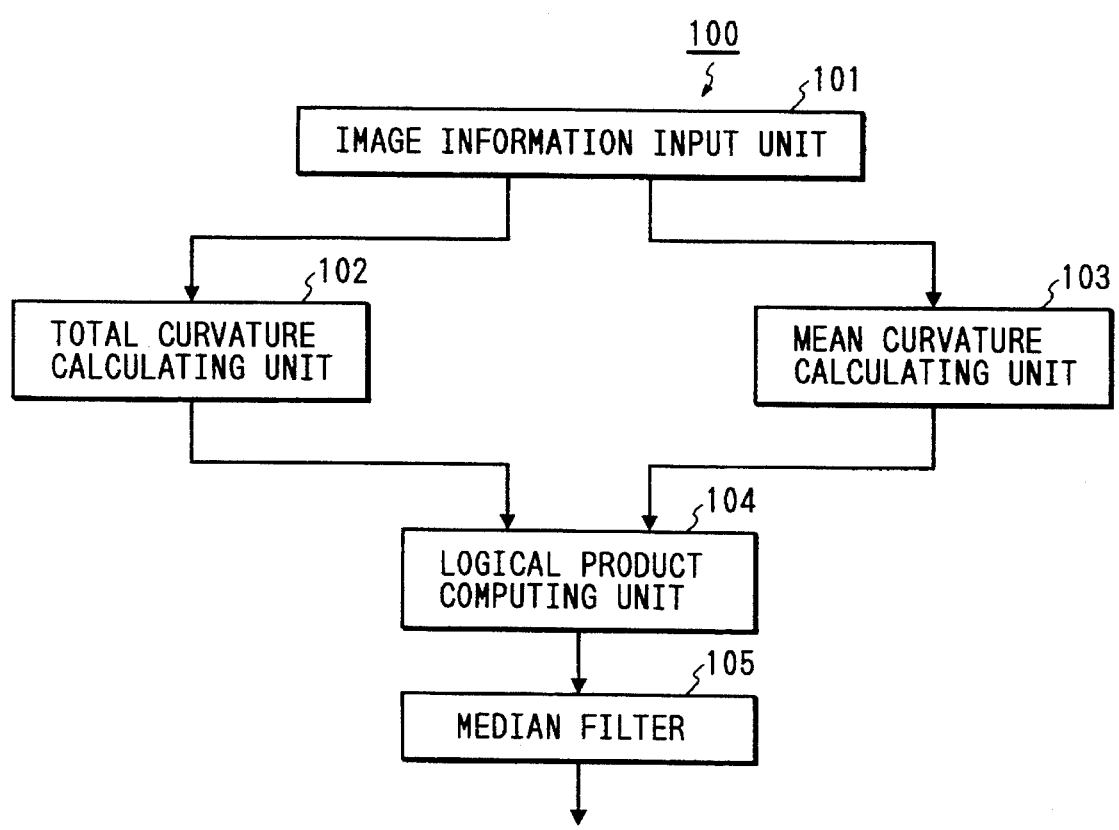
FIG. 1 is a block diagram showing an image processing apparatus according to the first embodiment of the present invention.

FIG. 1 is a block diagram showing the image processing apparatus according to the first embodiment of the present invention.

An image processing apparatus 100 includes an image information input unit 101, a total curvature calculating unit 102, a mean curvature calculating unit 103, a logical product computing unit 104, and a median filter 105. The total curvature calculating unit 102 calculates a total curvature K at each pixel using an image information signal supplied from the image information unit 101. The value of each pixel is set to "1" if the total curvature K is positive and set to "0" otherwise, thereby performing nonlinear binarization of each pixel represented by the image information signal. The mean curvature calculating unit 103 calculates a mean curvature H at each pixel using an image information signal supplied from the image information unit 101. If the mean curvature H is negative, the value of each pixel is set to "1", while if the mean curvature H is not negative, the value of each pixel is set to "0", thereby performing nonlinear binarization of each pixel represented by the image information signal. The logical product computing unit 104 computes the logical product of an output signal from the total curvature calculating unit 102 and an output signal from the mean curvature calculating unit 103 in units of pixels. The median filter 105 removes isolated points included in an output signal from the logical product computing unit 104.

The principle of an image processing method in the image processing apparatus 100 will be described below.

(1) Total Curvature and Mean Curvature

Figure 2C:
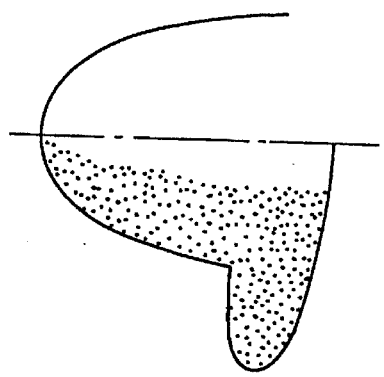
Figure 2B:
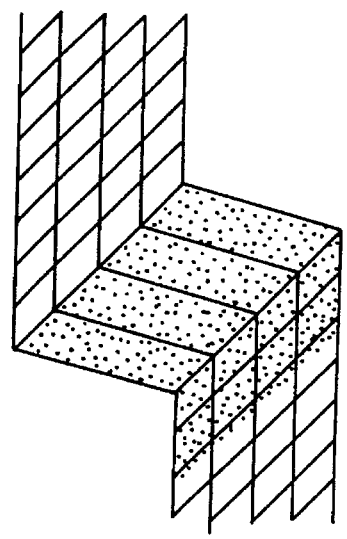
Figure 2A:
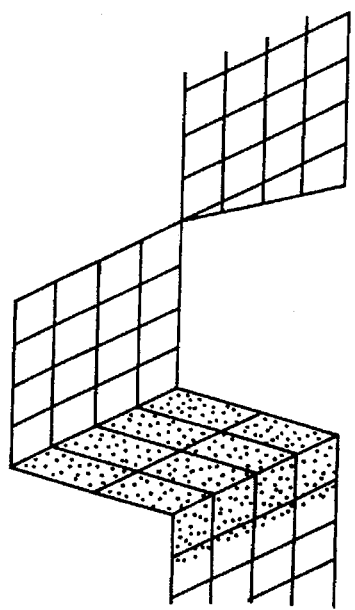

If the ridge and step present on the recording surface of a recording medium on the atomic order have stepped portions in only one direction, as shown in FIGS. 2A and 2B, they are regarded to be constituted by parabolic points. On the other hand, the recording bit is regarded to have a single peak, as shown in FIG. 2C, in accordance with the method of changing the surface shape of the recording medium using the principle of the scanning tunnel microscope or the method of changing the surface state of the recording medium using the electromagnetic wave such as an electron beam or light. The recording bit is regarded to be constituted by elliptic points near at least the maximum value of the single peak. The "shape having the single peak" is a shape whose height monotonously decreases away from the position of the maximum value within a certain range.

The total curvature K, the elliptic point, the parabolic point, and the hyperbolic point have the following relationships:

(a) Elliptic point for K>0
(b) Parabolic point for K=0
(c) Hyperbolic point for K<0

The total curvature K at each point (i.e., each pixel of image information) on the recording surface of the recording medium is obtained. If the sign of the total curvature K is positive (K>0), this point belongs to a recording bit area. If the total curvature K is "0" or its sign is negative (K<0), this point does not belong to the recording bit area. The sign of the mean curvature H at an elliptic point on the curved convex surface on the recording surface is negative (H<0). The mean curvature H at an elliptic point on the curved concave surface on the recording surface is positive (H>0). The mean curvature H at points belonging to the recording bit area is obtained to detect the polarization of the recording bit, i.e., the ON or OFF bit.

(2) Calculation of Total Curvature K and Mean Curvature H

The total curvature K and the mean curvature H are represented by equations (1) and (2) below:

$$K = (EG - F^2)^{-1} \begin{vmatrix} P & Q \\ Q & R \end{vmatrix} \quad (1)$$

$$H = \frac{1}{2} \frac{ER + GP - 2FQ}{EG - F^2} \quad (2)$$

where E, F, and G represent first fundamental quantities, and P, Q, and R represent second fundamental quantities, all of which are represented by equations (3) to (8) below:

$$E = x_u^2 + y_u^2 + z_u^2 \quad (3)$$

$$F = x_u x_v + y_u y_v + z_u z_v \quad (4)$$

$$G = x_v^2 + y_v^2 + z_v^2 \quad (5)$$

$$P = (EG - F^2)^{-1/2} \begin{vmatrix} x_{uu} & x_u & x_v \\ y_{uu} & y_u & y_v \\ z_{uu} & z_u & z_v \end{vmatrix} \quad (6)$$

$$Q = (EG - F^2)^{-1/2} \begin{vmatrix} x_{uv} & x_u & x_v \\ y_{uv} & y_u & y_v \\ z_{uv} & z_u & z_v \end{vmatrix} \quad (7)$$

$$R = (EG - F^2)^{-1/2} \begin{vmatrix} x_{vv} & x_u & x_v \\ y_{vv} & y_u & y_v \\ z_{vv} & z_u & z_v \end{vmatrix} \quad (8)$$

For example, $x_{vv}$ is the differential coefficient of second order of x by v, and $x_u$ is the differential coefficient of first order of x by u.

Assume an image defined as a function on the recording medium (two-dimensional plane) of the recording medium. Since x=u, y=v, and z=f(x,y) can be given, the first fundamental quantities E, F, and G and the second fundamental quantities P, Q, and R are represented by equations (9) to (14) below:

$$E = 1 + f_u^2 \quad (9)$$

$$F = f_u f_v \quad (10)$$

$$G = 1 + f_v^2 \quad (11)$$

$$P = (EG - F^2)^{-1/2} \begin{vmatrix} 0 & 1 & 0 \\ 0 & 0 & 1 \\ f_{uu} & f_u & f_v \end{vmatrix} = (EG - F^2)^{-1/2} f_{uu} \quad (12)$$

$$Q = (EG - F^2)^{-1/2} \begin{vmatrix} 0 & 1 & 0 \\ 0 & 0 & 1 \\ f_{uv} & f_u & f_v \end{vmatrix} = (EG - F^2)^{-1/2} f_{uv} \quad (13)$$

$$R = (EG - F^2)^{-1/2} \begin{vmatrix} 0 & 1 & 0 \\ 0 & 0 & 1 \\ f_{vv} & f_u & f_v \end{vmatrix} = (EG - F^2)^{-1/2} f_{vv} \quad (14)$$

The total curvature K and the mean curvature H can be obtained by equations (15) and (16), respectively:

$$K = (EG - F^2)^{-2} \begin{vmatrix} f_{uu} & f_{uv} \\ f_{uv} & f_{vv} \end{vmatrix} = \frac{f_{uu}f_{vv} - f_{uv}^2}{(1 + f_u^2 + f_v^2)^2} \quad (15)$$

$$= \frac{f_{xx}f_{yy} - f_{xy}^2}{(1 + f_x^2 + f_y^2)^2}$$

$$H = \frac{(1 + f_v^2)f_{uu} + (1 + f_u^2)f_{vv} - 2f_u f_v f_{uv}}{(1 + f_u^2 + f_v^2)^{3/2}} \quad (16)$$

$$= \frac{(1 + f_y^2)f_{xx} + (1 + f_x^2)f_{yy} - 2f_x f_y f_{xy}}{(1 + f_x^2 + f_y^2)^{3/2}}$$

(3) Approximation by Differentiation

In an actual calculation, image data on the two-dimensional plane are often given as $f = \{f_{ij}\}$ by differentiating the two-dimensional space. In this case, in an approximation within the range consisting of three vertical pixels and three horizontal pixels, the differential coefficients $f_u$, $f_v$, $f_{uu}$, $f_{vv}$, and $f_{uv}$ in equations (15) and (16) required to calculate the curvature at a pixel $f_{ij}$ can be obtained by equations (17) to (21) below:

$$f_u = f_x = (f_{i+1,j} - f_{i-1,j})/2 \quad (17)$$

$$f_v = f_y = (f_{i,j+1} - f_{i,j-1})/2 \quad (18)$$

$$f_{uu} = f_{xx} = (f_{i+1,j} + f_{i-1,j} - 2f_{i,j})/2 \quad (19)$$

$$f_{vv} = f_{yy} = (f_{i,j+1} - 2f_{i,j})/2 \quad (20)$$

$$f_{uv} = f_{xy} = (f_{i+1,j+1} + f_{i-1,j-1} - f_{i+1,j-1} - f_{i-1,j+1})/4 \quad (21)$$

Figure 3:
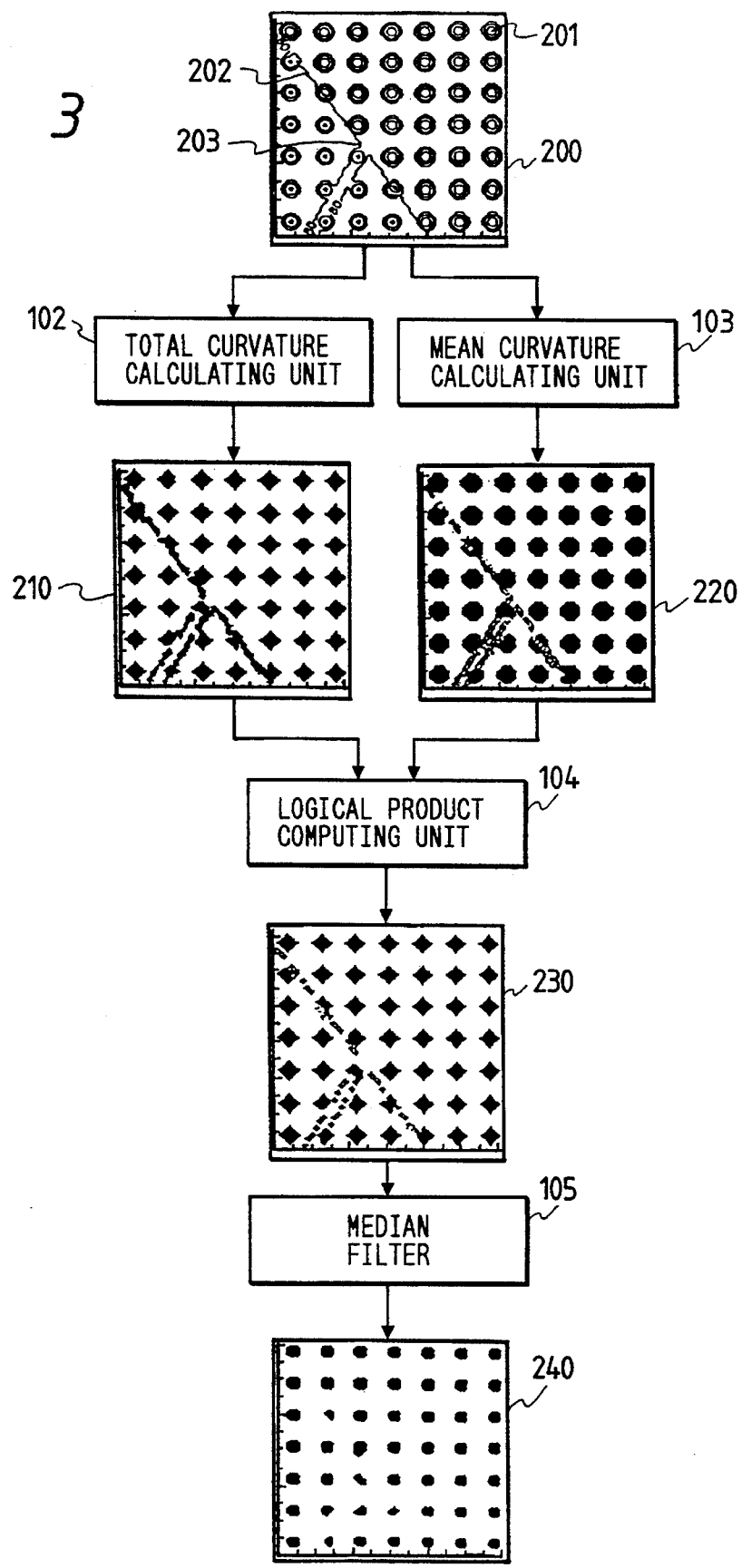
FIG. 3 is a view for explaining experimental results using the image processing apparatus shown in FIG. 1.

An experimental result for ON bit detection using the image processing apparatus 100 will be described with reference to FIG. 3 below.

An original image 200 represented by a contour line and input from the image information input unit 101 is constituted by a combination of an elliptic point area 201 representing a recording bit and a parabolic point area 202 representing a step or ridge. A plurality of parabolic point areas 202 interact with each other or spatial coordinates as an image definition area is subjected to discretization to obtain a hyperbolic point area 203. When an image signal representing the original image 200 is input to the total curvature calculating unit 102 to obtain a total curvature calculating unit output image 210 in which the parabolic and hyperbolic point areas 202 and 203 serve as isolated points. The image signal representing the original image 200 is input to the mean curvature calculating unit 103 to obtain a mean curvature calculating unit output image 220 in which a concave area and a flat area serve as isolated points. Output signals from the total curvature calculating unit 102 and the mean curvature calculating unit 103 are input to the logical product computing unit 104 to obtain a logical product computing output image 230 representing the extracted elliptic point area 201 representing the recording bit. However, the logical product computing unit output image 230 also includes the extracted elliptic point area caused by a discretization of the spatial coordinates in addition to the elliptic point area 201 representing the recording bit. An output signal from the logical product computing unit 104 is input to the median filter 105 to obtain an elliptic point extraction image 240 representing only the extracted elliptic point area 201 representing the ON bit.

Figure 4:
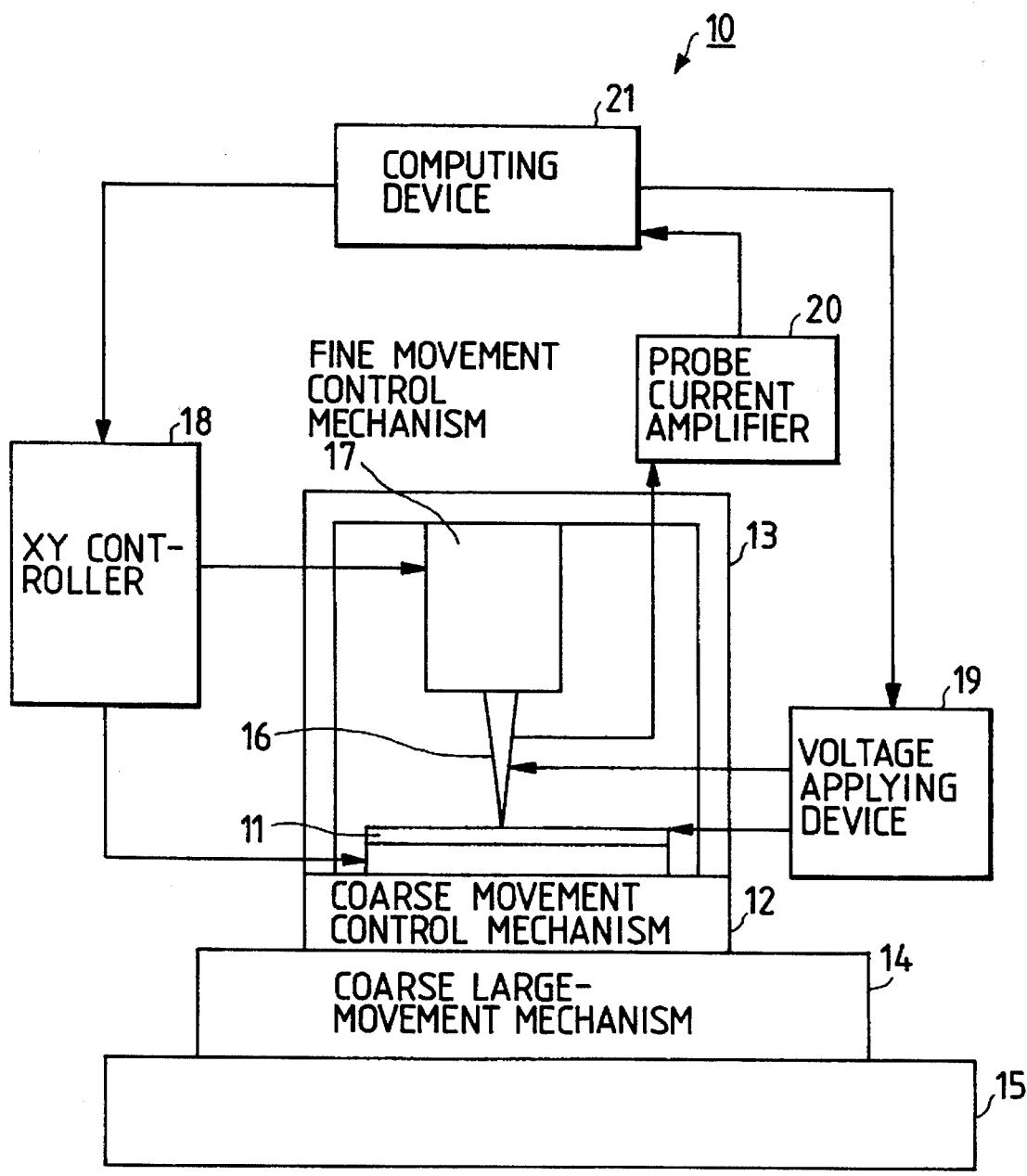
FIG. 4 is a schematic view showing a recording/reproducing apparatus according to the first embodiment of the present invention.

FIG. 4 is a schematic block diagram showing a recording/reproducing apparatus according to the first embodiment of the present invention.

A recording/reproducing apparatus 10 includes a recording medium 11, a coarse movement control mechanism 12, a housing 13, a coarse large-movement mechanism 14, an antivibration table 15, a probe electrode 16, a fine movement control mechanism 17, an XY controller 18, a voltage applying device 19, a probe current amplifier 20, and a computing device 21. The respective constituent components of the recording/reproducing apparatus 10 will be described in detail below.

(1) Recording Medium 11

Figure 5:
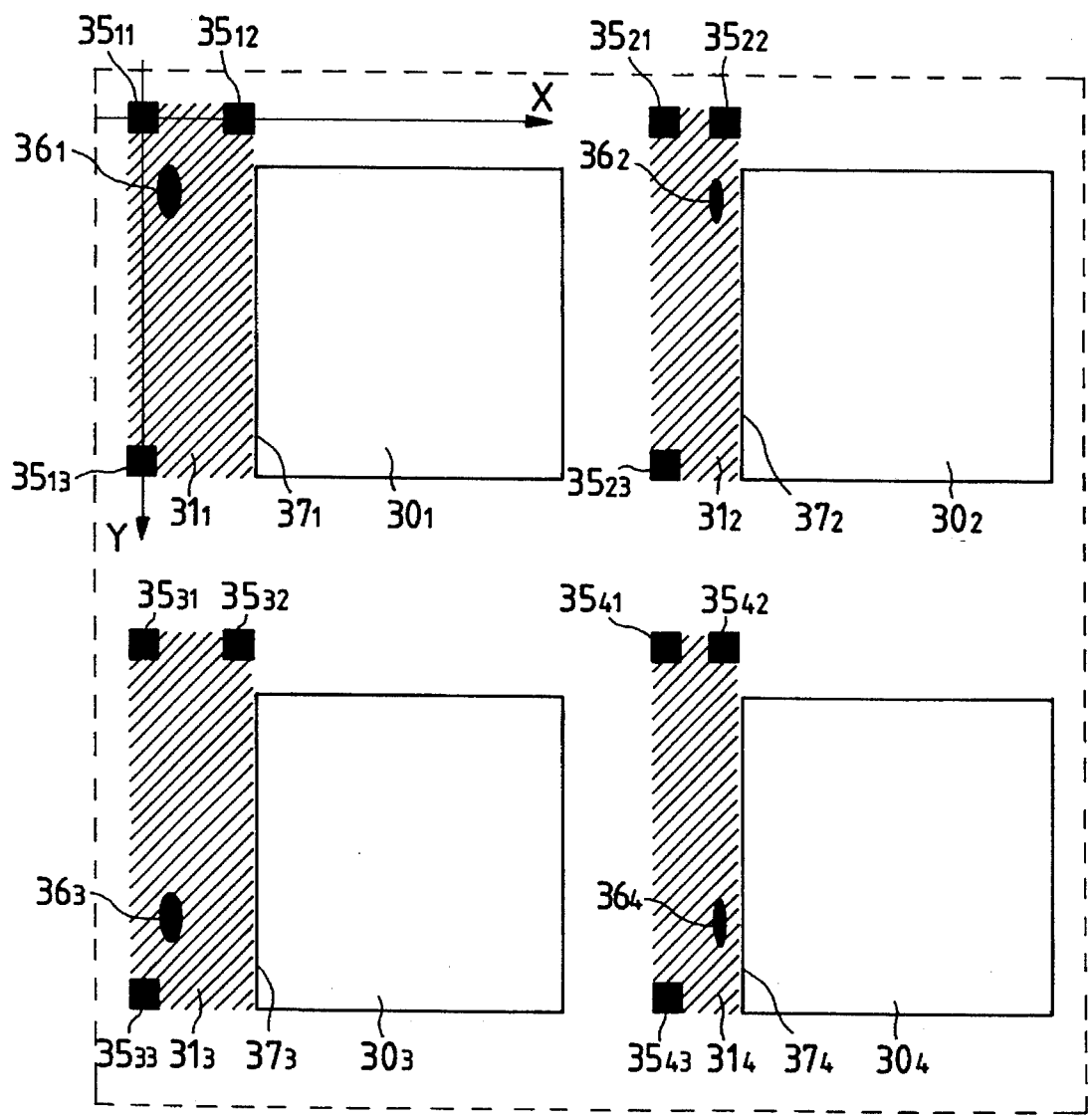
FIG. 5 is a view for explaining a position reference pattern and a recording signal area on the recording medium in the recording/reproducing apparatus shown in FIG. 4.

The recording medium 11 is obtained by stacking eight squalirium-bis-6-octylazulene layers on a graphite substrate in accordance with the LB method. In this case, squalirium-bis-6-octylazulene has a memory effect for the voltage and current switching characteristics. In the initial state, the recording medium is set in a non-recording state (OFF state). The recording surface of the recording medium 11 is divided into four general recording areas (first to fourth general recording areas $30_1$ to $30_4$), as shown in FIG. 5. First four position reference pattern areas $31_1$ to $31_4$ are assured to the left of the first to fourth general recording areas $30_1$ to $30_4$.

(2) Coarse Movement Control Mechanism 12, Housing 13, Coarse Large-Movement Mechanism 14, and Antivibration Table 15

The coarse movement control mechanism 12 on which the recording medium 11 is placed has parallel springs using an elastic hinge. The coarse movement control mechanism 12 controls coarse movement of the recording medium in the X and Y directions in FIG. 4. The housing 13 consists of Invar for supporting the respective structural portions of the recording/reproducing apparatus 10. Invar is a general term of an alloy such as Ni-Fe, Fe-Pt and Fe-Pd alloy, which has a property that the thermal expansion coefficient at room temperature is extremely low (one-tenth of an ordinary alloy). The coarse large-movement mechanism 14 controls coarse large-movement of the recording/reproducing apparatus 10 in the X and Y directions in FIG. 4 in a range falling outside the control range of the coarse movement control mechanism 12. The antivibration table 15 on the coarse large-movement mechanism 14 prevents transmission of an external vibration to the recording/reproducing apparatus 10, thereby preventing the operational error of the recording/reproducing apparatus 10 which is caused by the external vibration.

(3) Probe Electrode 16, Fine Movement Control Mechanism 17, and XY controller 18

The probe electrode 16 is used to record and reproduce information. The distal end of the probe electrode 16 is obtained by mechanically or electrolytically polishing the distal end of a tungsten stylus to increase the recording and reproduction resolutions. The material for the probe electrode 16 may be Pt-Ir or Pt. The method of forming the probe electrode 16 is not limited to the above method. The fine movement control mechanism 17 to which the probe electrode 16 is attached is constituted using a cylindrical piezoelectric element. The fine movement control mechanism 17 finely moves the probe electrode 16 in the Z direction in FIG. 4 to finely adjust the distance between the probe electrode 16 and the recording medium 11. At the same time, the fine movement control mechanism 17 two-dimensionally scans the probe electrode 16 in the X and Y directions in FIG. 4 with respect to the surface (recording surface) of the recording medium 11. The XY controller 18 drives and controls the coarse movement control mechanism 12 and the fine movement control mechanism 17 in accordance with commands from the computing device 21. The XY controller 18 outputs operation voltages representing the drive amounts of the coarse movement control mechanism 12 and the fine movement control mechanism 17 to the coarse movement control mechanism 12 and the fine movement control mechanism 17, respectively.

(4) Voltage Applying Device 19 and Current Amplifier 20

The voltage applying device 19 applies a recording voltage, a reproduction voltage, and an erasure voltage between the probe electrode 16 and the recording medium 11 in accordance with commands from the computing device 21. The voltage applying device 19 can apply an arbitrary bias voltage of −10 V to +10 V between the probe electrode 16 and the recording medium 11. The probe current amplifier 20 detects a current flowing between the probe electrode 16 and the recording medium 11 to amplify the detected current. The amplified current is converted into a voltage by the probe current amplifier 20. This voltage is then output from the probe current amplifier 20 to the computing device 21.

(5) Computing Device 21

The computing device 21 includes an A/D converter for converting the voltage supplied from the probe current amplifier 20 into a digital signal, a microprocessor for controlling the XY controller 18 and the voltage applying device 19, a position reference memory for storing the position reference on the recording medium 11, a processor for performing pattern recognition of information to be recorded and converting the recognized information into a code, and the image processing circuit (FIG. 1) for forming image information in accordance with the digital signal output from the A/D converter and extracting only the recorded bit area from the formed image information.

The position reference pattern and recording signal area on the recording medium 11 in the recording/reproducing apparatus 10 will be described with reference to FIG. 2.

In the recording/reproducing apparatus 10, the position reference pattern is recorded in the first to fourth position reference pattern areas $31_1$ to $31_4$ in accordance with the following sequence prior to recording of the information in the first to fourth general recording areas $30_1$ to $30_4$ of the recording medium 11.

The distal end of the probe electrode 16 on the recording medium is positioned at a position spaced apart from a home position $H_P$ of the recording medium 11 by about 200 μm in the Z direction in FIG. 4 with a precision of ±10 μm in accordance with the mechanical precision of the housing 13. A bias voltage of 300 mV from the voltage applying device 19 is applied across the probe electrode 16 and the recording medium 11. A current flowing across the probe electrode 16 and the recording medium 11 is detected and amplified by the probe current amplifier 20. The amplified current is converted into a voltage by the probe current amplifier 20. The computing device 21 detects the value of the current flowing across the probe electrode 16 and the recording medium 11 in accordance with the voltage applied from the probe current amplifier 20. The computing device 21 drives the coarse movement control mechanism 12 until the value of the detected current becomes 1 pA. As a result, the distal end of the probe electrode 16 comes close to the recording surface of the recording medium 11 until the value of the current flowing across the probe 16 and the recording medium 11 becomes 1 pA. The fine movement control mechanism 17 is driven in the same manner as described above by the computing device 21. The distal end of the probe electrode 16 comes close to the recording surface of the recording medium 11 until the value of the current flowing across the probe electrode 16 and the recording medium 11 becomes 1 nA. Thereafter, in an area of the recording medium 11 which is surrounded by a dotted line in FIG. 5, the probe electrode 16 is two-dimensionally driven by the computing device 21.

When the probe electrode 16 is scanned to the recording position of the first position reference pattern area $31_1$, a bias voltage of +10 V higher than the threshold voltage of the ON/OFF information of the recording medium 11 from the voltage applying device 19 is applied across the probe electrode 16 and the recording medium 11. This portion of the recording medium 11 is set in the recording state (ON state) to record the position reference pattern. During recording of the position reference pattern, the fine movement control mechanism 17 is controlled by the computing device 21 so that the average value of the current flowing between the probe electrode 16 and the recording medium 11 is set to 0.9 nA so as to reduce an influence on control of the distance between the probe electrode 16 and the recording medium 11. The average distance between the probe electrode 16 and the recording medium 11 is kept constant.

By repeating the above operations, the position reference patterns are sequentially recorded in the first to fourth position reference pattern areas $31_1$ to $31_4$. At this time, direction patterns and position patterns $36_1$ to $36_4$ are recorded in the first to fourth position reference pattern areas $31_1$ to $31_4$. Three direction patterns $35_{11}$ to $35_{13}$ recorded in the first position reference pattern $31_1$ are recorded at positions corresponding to three direction patterns $35_{31}$ to $35_{33}$ recorded in the third position reference pattern area $31_3$. Three direction patterns $35_{21}$ to $35_{23}$ recorded in the second position reference pattern area $31_2$ are recorded at positions corresponding to direction patterns $35_{41}$ to $35_{43}$ recorded in the fourth position reference pattern area $31_4$. In addition, first to fourth synchronization patterns $37_1$ to $37_4$ are recorded between the general recording areas $30_1$ to $30_4$ and the position reference patterns $31_1$ to $31_4$.

An operation of recording information in the general recording areas $30_1$ to $30_4$ and an operation of reproducing information from the general recording areas $30_1$ to $30_4$ in the recording/reproducing apparatus 10 will be described below.

Positioning of the probe electrode 16 is performed in accordance with the following sequence. A bias voltage of +5 V from the voltage applying device 19, which is lower than the threshold voltage of the ON/OFF state (recording/non-recording state) of the recording medium, is applied across the probe electrode 16 and the recording medium 11. In this state, the probe electrode 16 is two-dimensionally scanned throughout the recording surface of the recording medium 11. At this time, the value of a current (this current is generated due to the physical interaction between the probe electrode and the recording medium, and the physical interaction in the present invention is exemplified by a voltage, a magnetic force, light, or the like) flowing between the probe electrode 16 and the recording medium 11 is detected to detect the ON/OFF state of the recording medium, thereby detecting the position reference pattern.

The position reference patterns are recorded in the units of recording larger than those of information recorded in the general recording areas $30_1$ to $30_4$. For this reason, currents detected in the position reference pattern areas $31_1$ to $31_4$ have frequencies lower than those of the currents detected in the general recording areas $30_1$ to $30_4$. Each detected current is filtered through a bandpass filter to approximately separate the position reference pattern from information. The probe electrode 16 is moved to one of the four position reference pattern areas $31_1$ to $31_4$ on the basis of the two-dimensional information of each separated position reference pattern. The probe 16 is then two-dimensionally scanned in a range slightly larger than the position reference pattern area. The resultant digital signal obtained by the computing device 21 is stored as two-dimensional information in a memory.

As described above, the three direction patterns $35_{11}$ to $35_{13}$ and $35_{31}$ to $35_{33}$ are recorded at positions corresponding to the first and third position reference pattern areas $31_1$ and $31_3$. The three direction patterns $35_{21}$ to $35_{23}$ and $35_{41}$ to $35_{43}$ are recorded at positions corresponding to the second and fourth position reference pattern areas $31_2$ and $31_4$. The scanning direction of the probe electrode 16 can be known by detecting the direction patterns $35_{11}$ to $35_{13}$ $35_{31}$ to $35_{33}$, $35_{21}$ to $35_{23}$, and $35_{41}$ to $35_{43}$. Position patterns $36_1$ to $36_4$ are recorded in the first to fourth position reference pattern areas $31_1$ to $31_4$. Upon detection of the position patterns $36_1$ to $36_4$, the relative position of the probe electrode 16 can be known. More specifically, each position reference pattern includes direction information and position information. Using the general image processing technique, scanning direction information and position information of the probe electrode 16 can be obtained. In addition, coarse position information of the position reference pattern in a general recording area to be scanned next can be obtained in accordance with the positional relationship between the position reference patterns.

Information recording is performed in accordance with the following sequence. The probe electrode 16 is moved to a portion near, e.g., the first general recording area $30_1$ on the basis of the resultant position information. The probe electrode 16 is then two-dimensionally scanned in a range wider than the first general recording area $30_1$. Upon detection of a sync signal of the first synchronization pattern $37_1$ recorded in the first position reference pattern area $36_1$, information is recorded with the precision of a piezoelectric element at a predetermined recording position of the first general recording area $30_1$ on the basis of the resultant position information.

Information recorded in the first general recording area $30_1$ is reproduced as follows. The probe electrode 16 is two-dimensionally scanned in an entire area next to the synchronization signal of the first synchronization pattern $37_1$, and the resultant two-dimensional information (surface information) obtained by utilizing the physical interaction caused between the probe electrode and the recording medium is divided into units of recording (unit information area), as shown in FIGS. 2A to 2C in consideration of other pieces of input information such as the hysteresis of the piezoelectric element and the temperature- and humidity-dependent expansion/contraction of the recording medium 11. The above image processing is performed for each unit information area, thereby reproducing information. That is, the image-processed two-dimensional information is regarded as reproduced information. Upon completion of reproduction of the information recorded in the first general recording area $30_1$, the probe electrode 16 is moved to a portion near the second general recording area $30_2$ on the basis of the resultant position information.

Second Embodiment

An image processing apparatus according to the second embodiment of the present invention utilizes the following two points. First, two-dimensionally spread image information is defined as a function on a two-dimensional plane. The total curvature of the function at each point (each pixel of image information) on the two-dimensional plane is obtained. A point having a positive total curvature value is an elliptic point, and a point having a non-positive total curvature value is a parabolic or hyperbolic point. Second, the mean curvature of the function at each point on the two-dimensional plane is obtained. An elliptic point having a negative mean curvature value is convex on the recording surface, and an elliptic point having a positive mean curvature value is concave on the recording surface. To improve computing processing, the following processing is performed.

The total and mean curvatures of the function at each point on the two-dimensional plane are represented by the fractional numbers in equations (15) and (16), and the denominators always have positive values. Whether a total curvature value is positive or not can be detected by the sign of its numerator. Whether a mean curvature value is negative or not can be detected by the sign of its numerator. For this reason, the values of the numerators of the total and mean curvature values are obtained in place of obtaining the values of the total and mean curvatures. More specifically, if it is known in advance that an elliptic point on the curved convex surface on the recording surface represents necessary information, the value of the numerator of the total curvature is obtained by a calculating means for the numerator of total curvature, and the value of the numerator of the mean curvature is calculated by a calculating means for the numerator of mean curvature. A logical product of the outputs from the calculating means for the numerators of total and mean curvatures is computed. Noise included in the image information can be eliminated, and only necessary information can be extracted. An output signal from a logical product computing means is input to a median filter to remove noise caused by discretization of the spatial coordinates.

The recording/reproducing apparatus according to the second embodiment of the present invention also includes an image information forming means for calculating the values of the numerators of the total and mean curvatures at each pixel of the image information reproduced from a signal obtained by the physical interaction to form image information. The recording bit becomes an elliptic point on the curved convex surface on the recording surface. The parabolic point, the hyperbolic point, and the elliptic point on the curved concave surface on the recording surface are removed to obtain new information representing only the extracted recording bit.

The value of the numerator of the total curvature at each pixel and the value of the numerator of the mean curvature thereof can be obtained by calculating the first and second fundamental quantities at each pixel, respectively. Since the first and second fundamental quantities are locally defined, the processing form has excellent parallel processing independent of the number of pixels.

Figure 6:
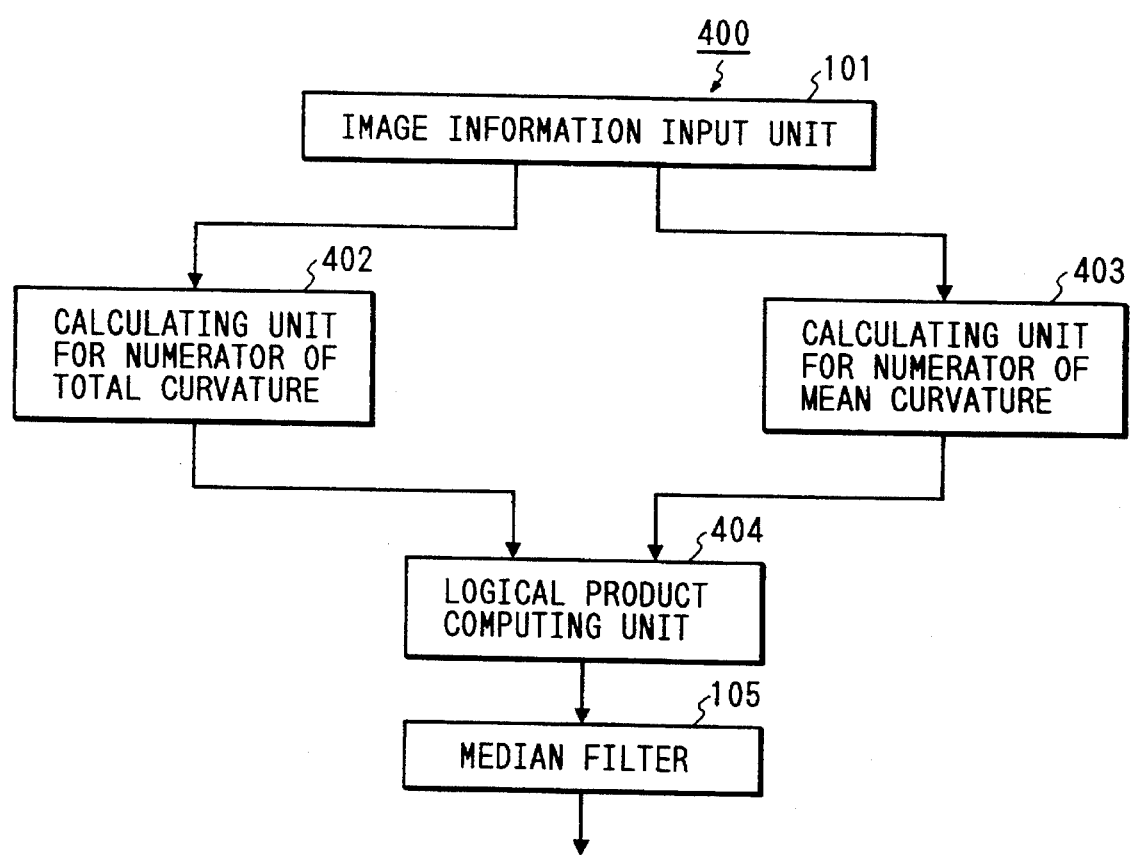
FIG. 6 is a block diagram showing an image processing apparatus according to the second embodiment of the present invention.

The second embodiment of the present invention will be described below with reference to the accompanying drawings. FIG. 6 is a block diagram showing the image processing apparatus according to the second embodiment of the present invention.

The same reference numerals as in FIG. 1 denote the same functions and parts in FIG. 6, and a detailed description thereof will be omitted.

A calculating unit 402 for a numerator of total curvature calculates the value of the numerator of the total curvature at each pixel using an image information signal sent from an image information input unit 101. If the value of the numerator of the total curvature is positive, the value of the corresponding pixel is set to "1"; otherwise, the value is set to "0", thereby nonlinear binarization for each pixel represented by the image information signal. A calculating unit 403 for the numerator of mean curvature calculates the value of the numerator of the mean curvature at each pixel using the image information signal sent from the image information input unit 101. If the value of the numerator of the mean curvature is negative, the value of the corresponding pixel is set to "1"; otherwise, the value is set to "0", thereby performing nonlinear binarization for each pixel represented by the image information signal. A logical product computing unit 404 computes, for each pixel, the logical product of output signals from the calculating unit 402 for the numerator of total curvature and the calculating unit 403 for the numerator of mean curvature.

Note that the principle of the image processing method in an image processing apparatus 400 is the same as in the first embodiment described above.

In the second embodiment, to simplify the image processing circuit 100 in FIG. 1, the total and mean curvatures themselves are not calculated, but only the values of the numerators of the total curvature K and the mean curvature H are calculated. In this case, the values can be obtained by the four fundamental rules of arithmetic. The total curvature calculating unit 102 and the mean curvature calculating unit 103 in FIG. 1 can be simplified, and hence the image processing apparatus itself can be simplified.

A technique for calculating the value of the numerator of the total curvature K and the value of the numerator of the mean curvature H will be described below.

A numerator value $K_1$ of the total curvature can be obtained by equation (22) based on the equation previously described:

$$\begin{aligned} K_1 &= f_{xx}f_{yy} - f_{xy}^2 \quad (22) \\ &= (f_{i+1,j} + f_{i-1,j} - 2f_{i,j})(f_{i,j+1} + f_{i,j-1} - 2f_{i,j})/4 - \\ & \quad (f_{i+1,j+1} + f_{i-1,j-1} - f_{i+1,j-1} - f_{i-1,j+1})^2/16 \\ &= K_{11} + K_{12} + K_{13} + K_{14} + K_{15} \end{aligned}$$

for $$\begin{aligned} K_{11} &= (f_{i+1,j}f_{i,j+1} + f_{i+1,j}f_{i,j-1} + \\ & \quad f_{i-1,j}f_{i,j+1} + f_{i-1,j}f_{i,j-1})/4 \quad (23) \end{aligned}$$

$$K_{12} = -(f_{i+1,j}f_{i,j} + f_{i-1,j}f_{i,j} + f_{i,j+1}f_{i,j} + f_{i,j-1}f_{i,j})/2 \quad (24)$$

$$K_{13} = (f_{i,j})^2 \quad (25)$$

$$\begin{aligned} K_{14} &= -((f_{i+1,j+1})^2 + (f_{i+1,j-1})^2 + \\ & \quad (f_{i-1,j+1})^2 + (f_{i-1,j-1})^2)/16 \quad (26) \end{aligned}$$

$$\begin{aligned} K_{15} &= -(f_{i+1,j+1}f_{i-1,j-1} + f_{i+1,j-1}f_{i-1,j+1} - \\ & \quad f_{i+1,j+1}f_{i+1,j-1} - f_{i+1,j+1}f_{i-1,j+1} - \\ & \quad f_{i+1,j-1}f_{i-1,j-1} - f_{i-1,j+1}f_{i-1,j-1})/8 \quad (27) \end{aligned}$$

A numerator value $H_1$ of the mean curvature can be obtained by equation (28) based on the equation previously described:

$$\begin{aligned} H_1 &= (1+(f_y)^2)f_{xx} + (1+(f_x)^2)f_{yy} - 2f_xf_yf_{xy} \quad (28) \\ &= H_{11} + H_{12} + H_{13} \end{aligned}$$

for $$\begin{aligned} H_{11} &= (1+(f_y)^2)f_{xx} \quad (29) \\ &= [1 + \{(f_{i,j+1} - f_{i,j-1})/2\}^2](f_{i+1,j} + \\ & \quad f_{i-1,j} - 2f_{i,j})/2 \end{aligned}$$

$$\begin{aligned} H_{12} &= (1+(f_x)^2)f_{yy} \quad (30) \\ &= [1 + \{(f_{i+1,j} - f_{i-1,j})/2\}^2](f_{i,j+1} + \\ & \quad f_{i,j-1} - 2f_{i,j})/2 \end{aligned}$$

$$\begin{aligned} H_{13} &= -2f_xf_yf_{xy} \quad (31) \\ &= -(f_{i+1,j} - f_{i-1,j})(f_{i,j+1} - f_{i,j-1})(f_{i+1,j+1} + \\ & \quad f_{i-1,j-1} - f_{i+1,j-1} - f_{i-1,j+1})/8 \end{aligned}$$

Figure 7:
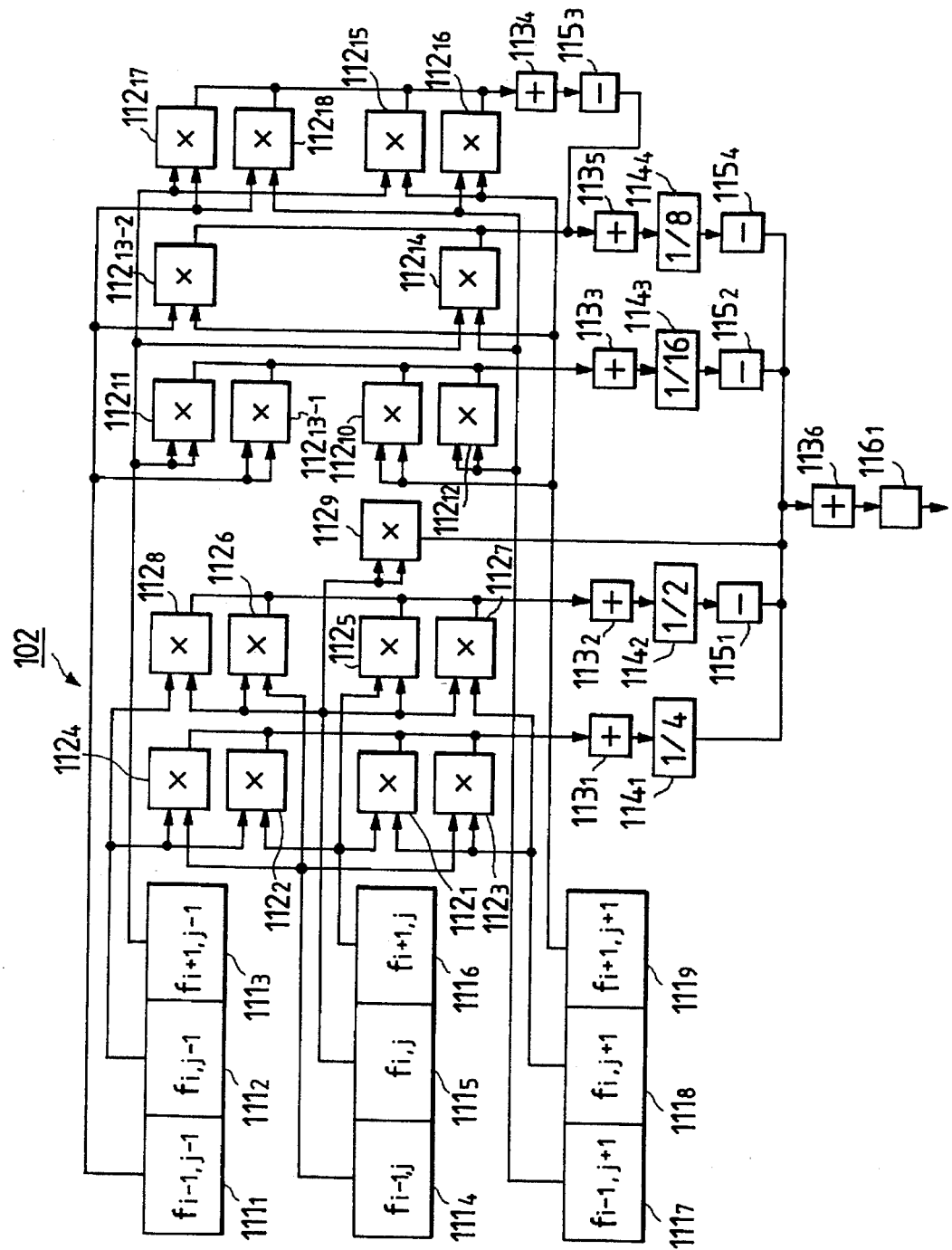
FIG. 7 is a block diagram showing the detailed arrangement of a calculating unit for the numerator of total curvature shown in FIG. 6.

The detailed arrangement of the calculating unit 402 for numerator of total curvature shown in FIG. 6 to obtain the numerator value $K_1$ of the total curvature which is represented by equation (22) will be described with reference to FIG. 7.

The calculating unit 402 for the numerator of total curvature comprises first to ninth shift registers 111₁ to 111₉, a first computing block for computing the variable $K_{11}$ represented in equation (23), a second computing block for computing the variable $K_{12}$ represented by equation (24), a third computing block for computing the variable $K_{13}$ represented by equation (25), a fourth computing block for computing the variable $K_{14}$ represented by equation (26), a fifth computing block for computing the variable $K_{15}$ represented by equation (27), a sixth computing block for computing the numerator value $K_1$ of the total curvature which is represented by equation (22) in accordance with output signals from the first to fifth computing blocks, and a first encoding block for encoding the numerator value $K_1$ of the total curvature.

The first to ninth shift registers 111₁ to 111₉ store the pixels $f_{i-1,j-1}$, $f_{i,j-1}$, $f_{i+1,j-1}$, $f_{i-1,j}$, $f_{i,j}$, $f_{i+1,j}$, $f_{i-1,j-1}$, $f_{i,j+1}$, and $f_{i+1,j+1}$, respectively.

The first computing block for computing the variable $K_{11}$ comprises a first multiplier 112₁ for multiplying the pixel value of the pixel $f_{i+1,j}$ with the pixel value of pixel $f_{i,j+1}$, a second multiplier 112₂ for multiplying the pixel value of the pixel $f_{i+1,j}$ with the pixel value of the pixel $f_{i,j-1}$, a third multiplier 112₃ for multiplying the pixel value of the pixel $f_{i-1,j}$ with the pixel value of pixel $f_{i,j+1}$, a fourth multiplier 112₄ for multiplying the pixel value of the pixel $f_{i-1,j}$ with the pixel value of the pixel $f_{i,j-1}$, a first adder 113₁ for adding output signals from the first, second, third, and fourth multipliers 112₁, 112₂, 112₃, and 112₄, and a first divider 114₁ for dividing the value of an output from the first adder 113₁ by ¼.

The second computing block for computing the variable $K_{12}$ comprises a fifth multiplier 112₅ for multiplying the pixel value of the pixel $f_{i+1,j}$ with the pixel value of pixel $f_{i,j}$, a sixth multiplier 112₆ for multiplying the pixel value of the pixel $f_{i-1,j}$ with the pixel value of the pixel $f_{i,j}$, a seventh multiplier 112₇ for multiplying the pixel value of the pixel $f_{i,j+1}$ with the pixel value of pixel $f_{i,j}$, an eighth multiplier 112₈ for multiplying the pixel value of the pixel $f_{i,j-1}$ with the pixel value of the pixel $f_{i,j}$, a second adder 113₂ for adding output signals from the fifth, sixth, seventh, and eighth multipliers 112₅, 112₆, 112₇, and 112₈, a second divider 114₂ for dividing the value of an output from the second adder 113₂ by ½, and a first sign inverter 115₁ for inverting the sign of an output signal from the second divider 114₂ to obtain a negative value.

The third computing block for computing the variable $K_{13}$ comprises a ninth multiplier 112₉ for computing the square of the pixel value of the pixel $f_{i,j}$.

The fourth computing block for computing the variable $K_{14}$ comprises a tenth multiplier $112_{10}$ for computing the square of the pixel value of the pixel $f_{i+1,j+1}$, an eleventh multiplier $112_{11}$ for computing the square of the pixel value of the pixel $f_{i+1,j-1}$, a twelfth multiplier $112_{12}$ for computing the square of the pixel value of the pixel $f_{i-1,j+1}$, a thirteenth multiplier $112_{13\text{-}1}$ for computing the square of the pixel value of the pixel $f_{i-1,j-1}$, a third adder $113_3$ for adding output signals from the tenth, eleventh, twelfth, and thirteenth multipliers $112_{10}$, $112_{11}$, $112_{12}$, and $112_{13\text{-}1}$, a third divider $114_3$ for dividing the value of an output from the third adder $113_3$ by 1/16, and a second sign inverter $115_2$ for inverting the sign of an output signal from the third divider $114_3$ to obtain a negative value.

The fifth computing block for computing the variable $K_{15}$ comprises a thirteenth multiplier $112_{13}$ for multiplying the pixel value of the pixel $f_{i+1,j+1}$ with the pixel value of pixel $f_{i-1,j-1}$, a fourteenth multiplier $112_{14}$ for multiplying the pixel value of the pixel $f_{i+1,j-1}$ with the pixel value of the pixel $f_{i-1,j+1}$, a fifteenth multiplier $112_{15}$ for multiplying the pixel value of the pixel $f_{i+1,j+1}$ with the pixel value of pixel $f_{i+1,j-1}$, a sixteenth multiplier $112_{16}$ for multiplying the pixel value of the pixel $f_{i+1,j+1}$ with the pixel value of the pixel $f_{i-1,j+1}$, a seventeenth multiplier $112_{17}$ for multiplying the pixel value of the pixel $f_{i+1,j-1}$ with the pixel value of pixel $f_{i-1,j-1}$, an eighteenth multiplier $112_{18}$ for multiplying the pixel value of the pixel $f_{i-1,j+1}$ with the pixel value of the pixel $f_{i-1,j-1}$, a fourth adder $113_4$ for adding output signals from the fifteenth, sixteenth, seventeenth, and eighteenth multipliers $112_{15}$, $112_{16}$, $112_{17}$, and $112_{18}$, a third sign inverter $115_3$ for inverting the sign of an output signal from the fourth adder $113_4$ to obtain a negative value, a fifth adder $113_5$ for adding output signals from the thirteenth multiplier $112_{13\text{-}2}$, the fourteenth multiplier $112_{14}$, and the third sign inverter $115_3$, a fourth divider $114_4$ for dividing an output signal from the fifth adder $113_5$ by 1/8, and a fourth sign inverter $115_4$ for inverting the sign of an output signal from the fourth divider $114_4$ to obtain a negative value.

The sixth computing block for computing the numerator value $K_1$ of the total curvature comprises a sixth adder $113_6$ for adding the output signals from the first divider $114_1$, the first sign inverter $115_1$, the second sign inverter $115_2$, and the fourth sign inverter $115_4$.

The first encoding block for encoding the numerator value $K_1$ of the total curvature comprises a first comparator $116_1$ for setting the pixel value of the pixel $f_{i,j}$ to "1" when the value (numerator value $K_1$ of the total curvature) of an output signal from the sixth adder $113_6$ is positive, and for setting the pixel value of the pixel $f_{i,j}$ to "0" when the value (numerator value $K_1$ of the total curvature) of the output signal from the sixth adder $113_6$ is not positive.

Figure 8:
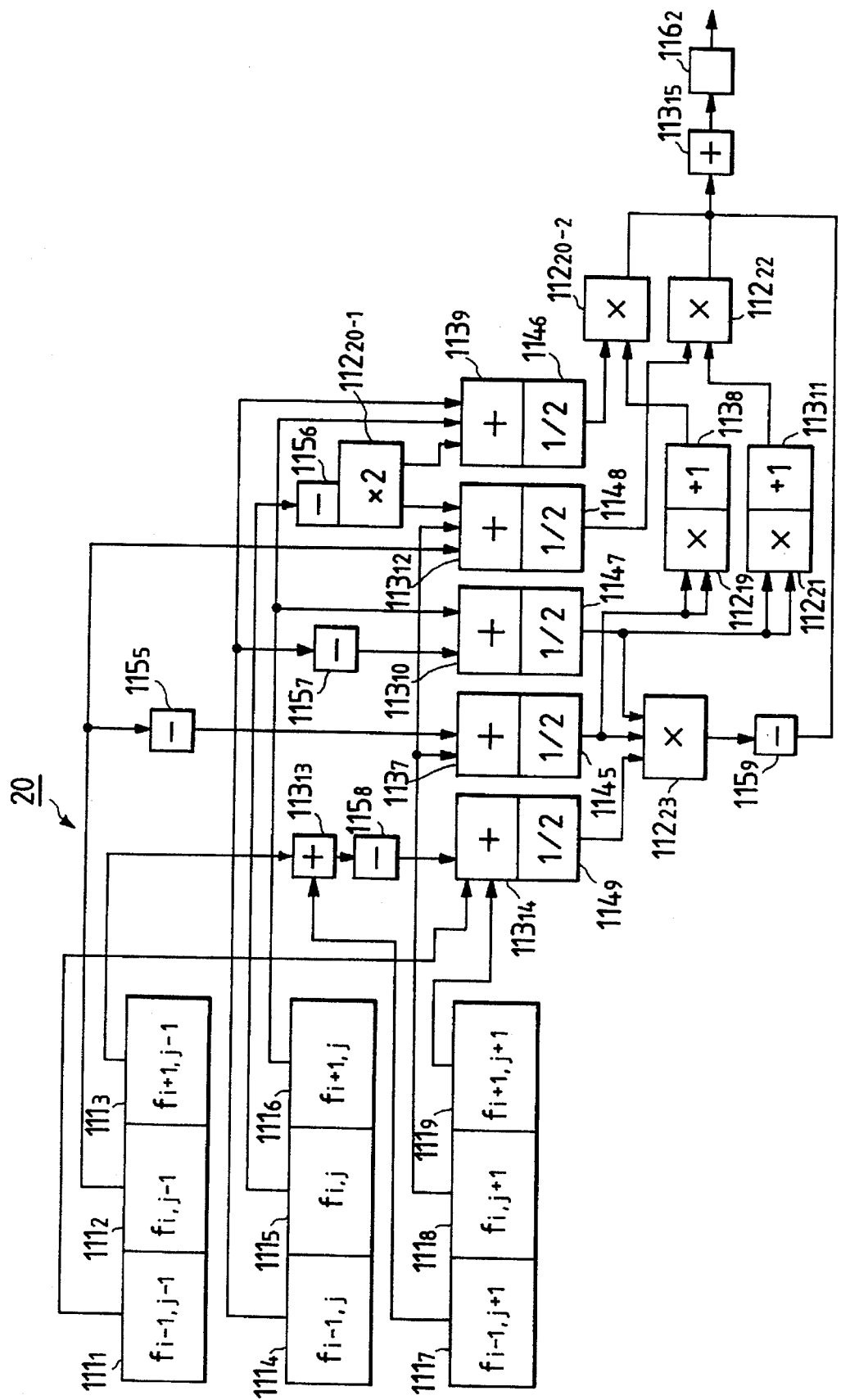
FIG. 8 is a block diagram showing the detailed arrangement of a calculating unit for the numerator of mean curvature shown in FIG. 6.

The detailed arrangement of the calculating unit 403 for numerator of mean curvature, shown in FIG. 6, to obtain the numerator value $H_1$ of the mean curvature, which is represented by equation (28) will be described with reference to FIG. 8.

The calculating unit 403 for the numerator of mean curvature comprises a seventh computing block for computing the variable $H_{11}$ represented by equation (29), an eighth computing block for computing the variable $H_{12}$ represented by equation (30), a ninth computing block for computing the variable $H_{13}$ represented by equation (31), a tenth computing block for computing the numerator value $H_1$ of the mean curvature which is represented by equation (28) in accordance with output signals from the seventh to ninth computing blocks, and a second encoding block for encoding the numerator value $H_1$ of the mean curvature. For the sake of descriptive convenience, the first to ninth shift registers $111_1$ to $111_9$ are also illustrated in FIG. 8.

The seventh computing block for computing the variable $H_{11}$ comprises a fifth sign inverter $115_5$ for inverting the sign of the pixel value of the pixel $f_{i,j-1}$ to obtain a negative value, a seventh adder $113_7$ for adding the pixel value of the pixel $f_{i,j-1}$ and an output signal from the fifth sign inverter $115_5$, a fifth divider $114_5$ for dividing the value of an output signal from the seventh adder $113_7$ by 1/2, a nineteenth multiplier $112_{19}$ for computing the square of the value of an output signal from the fifth divider $114_5$, an eighth adder $113_8$ for adding "1" to the value of an output signal from the nineteenth multiplier $112_{19}$, a sixth sign inverter $115_6$ for inverting the sign of the pixel value of the pixel $f_{i,j}$ to obtain a negative value, a twentieth multiplier $112_{20\text{-}1}$ for doubling the value of an output signal from the sixth sign inverter $115_6$, a ninth adder $113_9$ for adding the pixel value of the pixel $f_{i+1,j}$, the pixel value of the pixel $f_{i-1,j}$, and the value of an output signal from the twentieth multiplier $112_{20\text{-}1}$, a sixth divider $114_6$ for dividing the value of an output signal from the ninth adder $113_9$ by 1/2, and a twentieth multiplier $112_{20\text{-}2}$ for multiplying the value of an output signal from the eighth adder $13_8$ with the value of an output signal from the sixth divider $14_6$.

The eighth computing block for computing the variable $H_{12}$ comprises a seventh sign inverter $115_7$ for inverting the sign of the pixel value of the pixel $f_{i-1,j}$ to obtain a negative value, a tenth adder $113_{10}$ for adding the pixel value of the pixel $f_{i+1,j}$ and an output signal from the seventh sign inverter $115_7$, a seventh divider $114_7$ for dividing the value of an output signal from the tenth adder $113_{10}$ by 1/2, a twenty-first multiplier $112_{21}$ for computing the square of the value of an output signal from the seventh divider $114_7$, an eleventh adder $113_{11}$ for adding "1" to the value of an output signal from the twenty-first multiplier $112_{21}$, a twelfth adder $113_{12}$ for adding the pixel value of the pixel $f_{i,j+1}$, the pixel value of the pixel $f_{i,j-1}$, and the value of an output signal from the twentieth multiplier $112_{20}$, an eighth divider $114_8$ for dividing the value of an output signal from the twelfth adder $113_{12}$ by 1/2, and a twenty-second multiplier $112_{22}$ for multiplying the value of an output signal from the eleventh adder $113_{11}$ with the value of an output signal from the eighth divider $114_8$.

The ninth computing block for computing the variable $H_{13}$ comprises a thirteenth adder $113_{13}$ for adding the pixel value of the pixel $f_{i+1,j-1}$ and the pixel value of the pixel $f_{i-1,j+1}$, an eighth sign inverter $115_8$ for inverting the sign of the value of an output signal from the thirteenth adder $113_{13}$, a fourteenth adder $113_{14}$ for adding the pixel value of the pixel $f_{i+1,j+1}$, the pixel value of the pixel $f_{i-1,j-1}$, and the value of an output signal from the thirteenth adder $113_{13}$, a ninth divider $114_9$ for dividing the value of an output signal from the fourteenth adder $113_{14}$ by 1/2, a twenty-third multiplier $112_{23}$ for multiplying the value of the output signal from the seventh divider $114_7$, the value of the output signal from the eighth divider $114_8$, and the value of an output signal from the ninth divider $114_9$, and a ninth sign inverter $115_9$ for inverting the sign of the value of an output signal from the twenty-third multiplier $112_{23}$ to obtain a negative value.

The tenth computing block for computing the numerator value $H_1$ of the mean curvature comprises a fifteenth adder $113_{15}$ for adding the value of the output signal from the twentieth multiplier $112_{20}$, the value of the output signal from the twenty-second multiplier $12_{22}$, and the value of the output signal from the ninth sign inverter $115_9$.

The second encoding block for encoding the numerator value $H_1$ of the mean curvature comprises a second comparator $116_2$ for setting the pixel value of the pixel $f_{i,j}$ to "1" when the value (numerator value $H_1$ of mean curvature) of the output signal from the fifteenth adder $113_{15}$ is negative, and for setting the pixel value of the pixel $f_{i,j}$ to "0" when the value (numerator value $H_1$ of mean curvature) of the output signal from the fifteenth adder $113_{15}$ is not negative.

Figure 9:
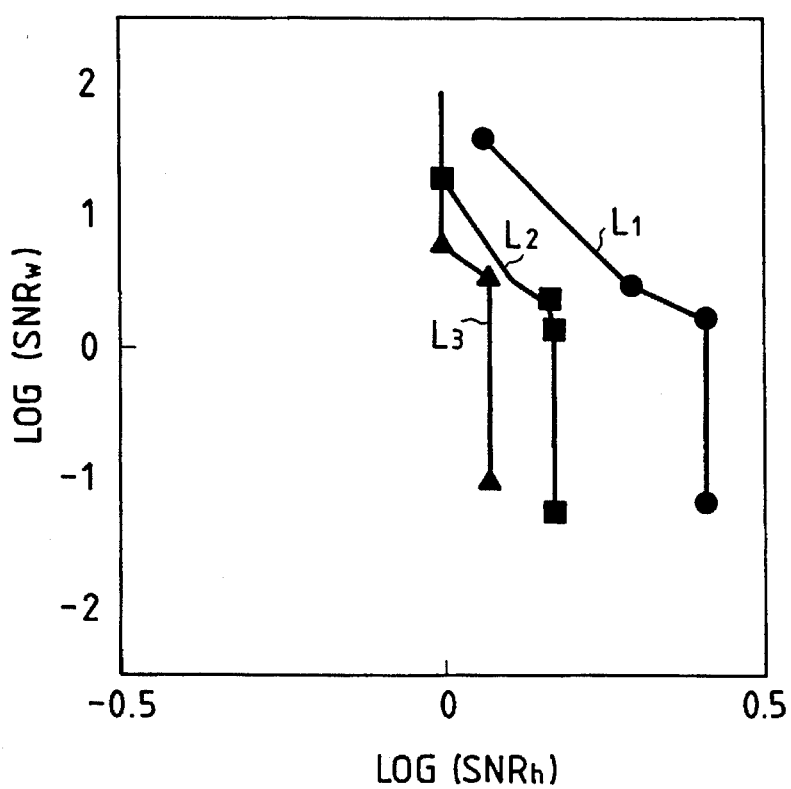
FIG. 9 is a graph showing an experimental example of the recognition map of a recording bit by the image processing apparatus shown in FIG. 6.

FIG. 9 is a graph showing an experimental result of a recognition map of a recording bit in the image processing apparatus 400. Referring to FIG. 9, the abscissa represents the logarithmic values (=log(recording bit height/ridge height)) of $SNR_h$ concerning the height, and the ordinate represents the logarithmic values (=log(recording bit diameter/ridge width)) of $SNR_W$ concerning the diameter. A boundary line $L_1$ represents the recognition boundary line when the recording bit height is level "255" and the recording bit diameter corresponds to 5 bits. A boundary line $L_2$ is the recognition boundary line when the recording bit height is level "255" and the recording bit diameter corresponds to 7 pixels. A boundary line $L_3$ is the recognition boundary line when the recording bit height is level "255" and the recording bit diameter corresponds to 9 pixels. The recording bit is recognized in 100% under the conditions described to the right of the boundary lines $L_1$, $L_2$, and $L_3$.

As can be apparent from the results shown in FIG. 9, the height and diameter of the recording bit are selected so that the logarithmic values of $SNR_h$ and $SNR_W$ respectively concerning the height and diameter of a ridge (this also applies to a step) having a given height and a given width are located to the right of the boundary lines $L_1$, $L_2$, and $L_3$, thereby recognizing the recording bit in 100%.

The image processing circuit of the second embodiment can also be applied to the recording/reproducing apparatus shown in FIG. 4.

Third Embodiment

Unlike the first and second embodiments, an image processing apparatus and a recording/reproducing apparatus according to the third embodiment are arranged as follows. To store other signals preset in image data and remove only impulse noise, the value of a given pixel of the image defined on the two-dimensional plane is determined and updated on the basis of an entropy value calculated from the values of pixels near the given pixel. That is, a so-called entropy filter is operated to filter the image data. The arrangement method and function of the entropy filter will be described below.

The value of a pixel in an image $f_{i,j}$ as a function defined on a two-dimensional discrete space $(i,j) \in Z^2$ is updated on the basis of an entropy $\epsilon_{i,j}$ calculated by equations (32) to (34) using values $f_{k,l}$ (where $k, l \in N(i,j)$) of a pixel $N(i,j)$ near the pixel $f_{i,j}$:

$$\tilde{f}_{k,l} = f_{k,l} - \min_{k,l \in N(i,j)} [f_{k,l}] \tag{32}$$

$$p_{k,l} = \frac{\tilde{f}_{k,l}}{\sum_{k',l' \in N(i,j)} \tilde{f}_{k',l'}} \tag{33}$$

$$\epsilon_{i,j} = -\sum_{k,l \in N(i,j)} p_{k,l} \log(p_{k,l}) \tag{34}$$

Since the entropy of the pixel in which the impulse noise exits is zero, the pixel $f_{i,j}$ is updated for $\epsilon_{i,j}=0$ as follows:

$$f_{i,j} = \min_{k,l \in N(n,j)} [f_{k,l}]$$

Figure 10A:
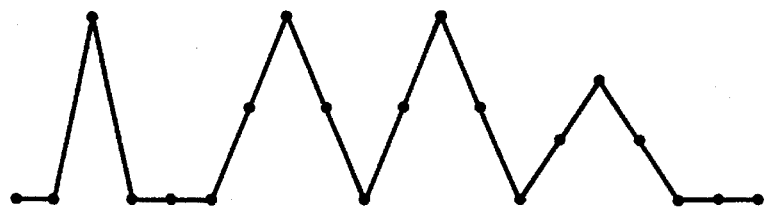
Figure 10B:
Figure 10C:
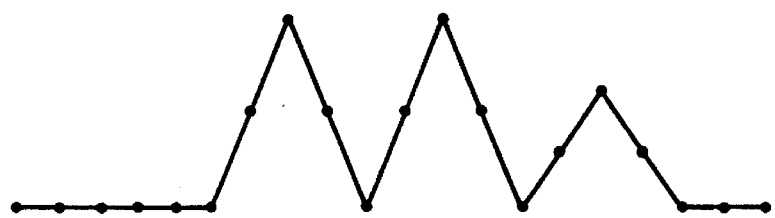

If $\epsilon_{i,j} \neq 0$, then $f_{i,j}$ is updated to $f_{i,j}$ (i.e., the value of the pixel is not updated). In this case, only the impulse noise is removed. FIGS. 10A to 10C are charts showing a difference between the filter characteristics of the median filter and the entropy filter. When an input signal is present, as shown in FIG. 10A, a signal shown in FIG. 10B is obtained from the median filter, and a signal shown in FIG. 10C is obtained from the entropy filter. As can be apparent from these charts, the filter characteristics of the median filter also change in response to a signal except for the impulse noise, while the entropy filter removes only the impulse noise. Therefore, the entropy filter preserves a local shape required for calculating a curvature. When this entropy filter is applied to the image processing apparatuses of the first and second embodiments and the recording/reproducing apparatus, the recording bit area can be accurately extracted. The S/N ratio of a recording bit read signal can be increased to reduce the error rate.

Figure 11:
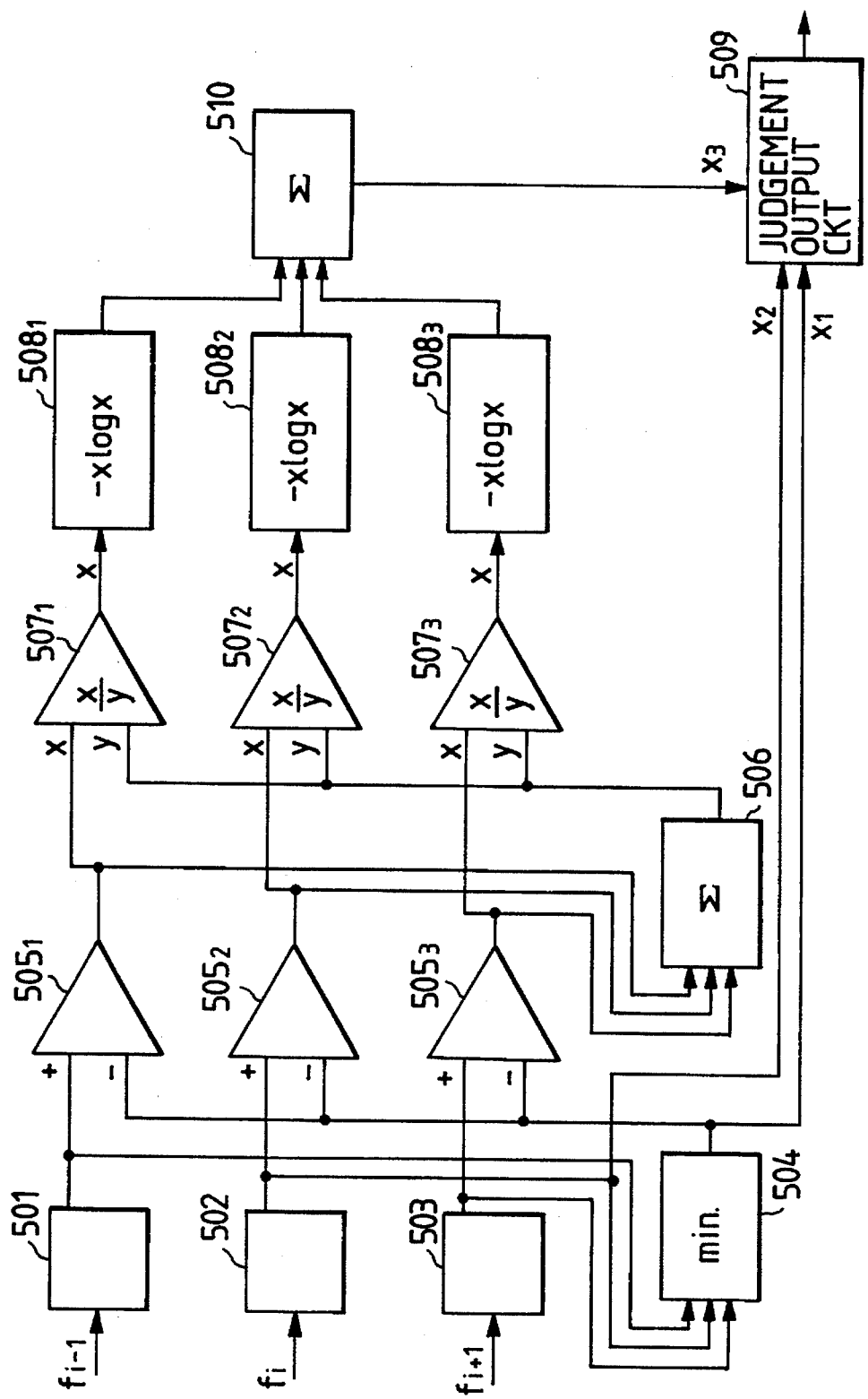
FIG. 11 is a block diagram showing the arrangement of the entropy filter.

FIG. 11 is a block diagram showing the arrangement of the entropy filter. For the sake of descriptive simplicity, a one-dimensional entropy filter is illustrated, which is easily extended to a two-dimensional form used in practice.

Registers 501 to 503 for storing values $f_{i-1}$, $f_i$, and $f_{i+1}$ of three pixels centered on a target pixel defined as $f_i$ are arranged. Subtracters $505_1$ to $505_3$ are arranged at the outputs of the registers 501 to 503, respectively. A minimum value circuit 504 is arranged to receive the outputs from the registers 501 to 503. The minimum value circuit 504 outputs the minimum one of the values $f_{i-1}$, $f_i$, and $f_{k+1}$. The outputs from the registers 501 to 503 are input to the + terminals of the subtracters $505_1$ to $505_3$, respectively. An output from the minimum value circuit 504 is commonly input to the— terminals of the subtracters $505_1$ to $505_3$.

The outputs of the subtracters $505_1$ to $505_3$ are connected to the dividend input terminals of dividers $507_1$ to $507_3$, respectively, and commonly to an adder 506. The adder 506 calculates the sum of the outputs from the subtracters $505_1$ to $505_3$. The output of the adder 506 is commonly connected to the divider input terminals of dividers $507_1$ to $507_3$. The outputs from the dividers $507_1$ to $507_3$ are input to logarithmic circuits $508_1$ to $508_3$, respectively. Each of the logarithmic circuits $508_1$ to $508_3$ receives an input x and outputs $-x \cdot \log(x)$. The outputs of the logarithmic circuits $508_1$ to $508_3$ are connected to an adder 510 for calculating the sum of the outputs from the logarithmic circuits $508_1$ to $508_3$.

A judgement output circuit 509 is arranged in this entropy filter. The judgement output circuit 509 has three input terminals $x_1$ to $x_3$. If $x_3=0$, then the circuit 509 outputs $x_1$. If $x_3 \neq 0$, then the circuit 509 outputs $x_2$. The output of the minimum value circuit 504 is connected to the $x_1$ terminal, the output of the register 502 is connected to the $x_2$ terminal, and the output of the adder 510 is connected to the $x_3$ terminal.

Since the entropy filter is arranged as described above, an output from the adder 510 becomes an entropy value $\epsilon_i$ near the pixel $f_i$. If this entropy value $\epsilon_i$ is zero, the output value of the minimum value circuit is output from this entropy filter. If the value $\epsilon_i$ is not zero, the output, i.e., the pixel value $f_i$ from the register 502 is output from the entropy filter. As a result, only the impulse noise is removed.

Figure 12:
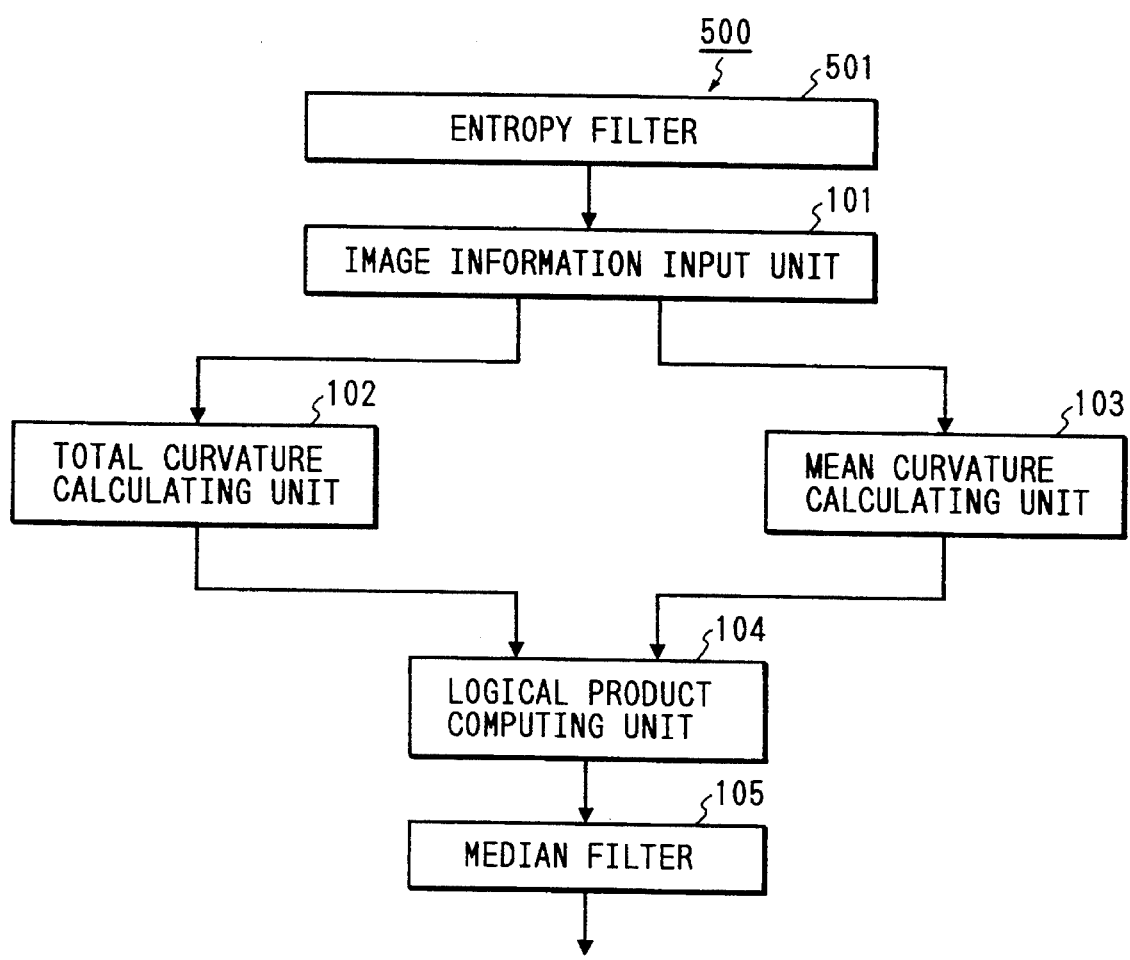
FIG. 12 is a block diagram showing an image processing apparatus according to the third embodiment of the present invention.

In the image processing apparatus (FIG. 12) according to the third embodiment, the entropy filter 501 (more specifically, the two-dimensional entropy filter) is used to update the value of each pixel in accordance with the entropy value. The updated image data is then subjected to recording bit extraction in circuits from an image information input unit 101 in FIG. 12. Note that the image processing circuit of the third embodiment is applicable to the recording/reproducing apparatus shown in FIG. 4. Note that a total curvature calculating means 102 and a mean curvature calculating unit 103 can be replaced with the computing means for numerator of total curvature and the calculating means for numerator of mean curvature described in the second embodiment.

What is claimed is:

1. An image information processing apparatus for processing image information, comprising:
    total curvature calculating means for calculating a total curvature at each pixel of the image information;
    mean curvature calculating means for calculating a mean curvature at each pixel of the image information;
    logical product computing means for computing a logical product of outputs from said total curvature calculating means and said mean curvature calculating means; and
    a median filter for filtering an output from said logical product computing means.

2. An apparatus according to claim 1, further comprising:
    entropy calculating means for calculating an entropy value of a portion near each pixel of the image information; and
    updating means for updating the value of each pixel on the basis of the entropy value, and
    wherein said total curvature calculating means calculates the total curvature at each pixel updated by said updating means, and said mean curvature calculating means calculates the mean curvature at each pixel updated by said updating means.

3. An image information processing apparatus for processing image information, comprising:
    means for calculating a numerator of a total curvature at each pixel of the image information;
    means for calculating a numerator of a mean curvature at each pixel of the image information;
    logical product computing means for computing a logical product of outputs from said means for calculating the numerator of the total curvature and said means for calculating the numerator of the mean curvature; and
    a median filter for filtering an output from said logical product computing means.

4. An apparatus according to claim 3, further comprising:
    entropy calculating means for calculating an entropy value of a portion near each pixel of the image information; and
    updating means for updating the value of each pixel on the basis of the entropy value, and
    wherein said means for calculating the numerator of the total curvature calculates the numerator of the total curvature at each pixel updated by said updating means, and said means for calculating the numerator of the mean curvature calculates the numerator of the mean curvature at each pixel updated by said updating means.

5. An information recording/reproducing apparatus for reproducing information from a recording medium by utilizing a physical interaction between a probe and the recording medium while the probe and the recording medium are two-dimensionally scanned relative to each other, comprising:
    total curvature calculating means for calculating a total curvature at each pixel of surface information of the recording medium, the surface information being detected by the physical interaction;
    mean curvature calculating means for calculating a mean curvature at each pixel of the surface information;
    logical product computing means for computing a logical product of outputs from said total curvature calculating means and said mean curvature calculating means; and
    a median filter for filtering an output from said logical product computing means,
    wherein an output from said medium filter is reproduced information.

6. An apparatus according to claim 5, further comprising:
    entropy calculating means for calculating an entropy value of a portion near each pixel of the image information; and
    updating means for updating the value of each pixel on the basis of the entropy value, and
    wherein said total curvature calculating means calculates the total curvature at each pixel updated by said updating means, and said mean curvature calculating means calculates the mean curvature at each pixel updated by said updating means.

7. An information recording/reproducing apparatus for reproducing information from a recording medium by utilizing a physical interaction between a probe and the recording medium while the probe and the recording medium are two-dimensionally scanned relative to each other, comprising:
    means for calculating a numerator of a total curvature at each pixel of surface information of the recording medium, the surface information being detected by the physical interaction;
    means for calculating a numerator of a mean curvature at each pixel of the surface information;
    logical product computing means for computing a logical product of outputs from said means for calculating the numerator of the total curvature and said means for calculating the numerator of the mean curvature; and
    a median filter for filtering an output from said logical product computing means,
    wherein an output from said median filter is reproduced information.

8. An apparatus according to claim 7, further comprising:
    entropy calculating means for calculating an entropy value of a portion near each pixel of the image information; and
    updating means for updating the value of each pixel on the basis of the entropy value, and
    wherein said means for calculating the numerator of the total curvature calculates the numerator of the total curvature at each pixel updated by said updating means, and said means for calculating the numerator of the mean curvature calculates the numerator of the mean curvature at each pixel updated by said updating means.

* * * * *

UNITED STATES PATENT AND TRADEMARK OFFICE
CERTIFICATE OF CORRECTION

PATENT NO. : 5,502,710

DATED : March 26, 1996

INVENTOR(S): TERUYOSHI WASHIZAWA ET AL.

It is certified that error appears in the above-identified patent and that said Letters Patent is hereby corrected as shown below:

On the title page, item

[56] REFERENCES CITED

Line FPD, "1142988  6/1989  Japan" should read
--1-142988  6/1989  Japan--.

COLUMN 7

Line 35, "$f_{vv}=f_{yy}=(f_{i,j+1}-2f_{i,j})/2$  (20)" should read
--$f_{vv}=f_{yy}=(f_{i,j+1}+f_{i,j-1}-2f_{i,j})/2$  (20)--.

COLUMN 11

Line 18, "$35_{13}\ 35_{31}$" should read --$35_{13}, 35_{31}$--.

COLUMN 20

Line 15, "medium" should read --median--.

Signed and Sealed this

Twentieth Day of August, 1996

*Attest:*

BRUCE LEHMAN

*Attesting Officer*     *Commissioner of Patents and Trademarks*